Oct. 6, 1964     P. TROMBETTA     3,151,708
ELECTRICAL SYSTEM
Filed Sept. 15, 1961     2 Sheets-Sheet 1
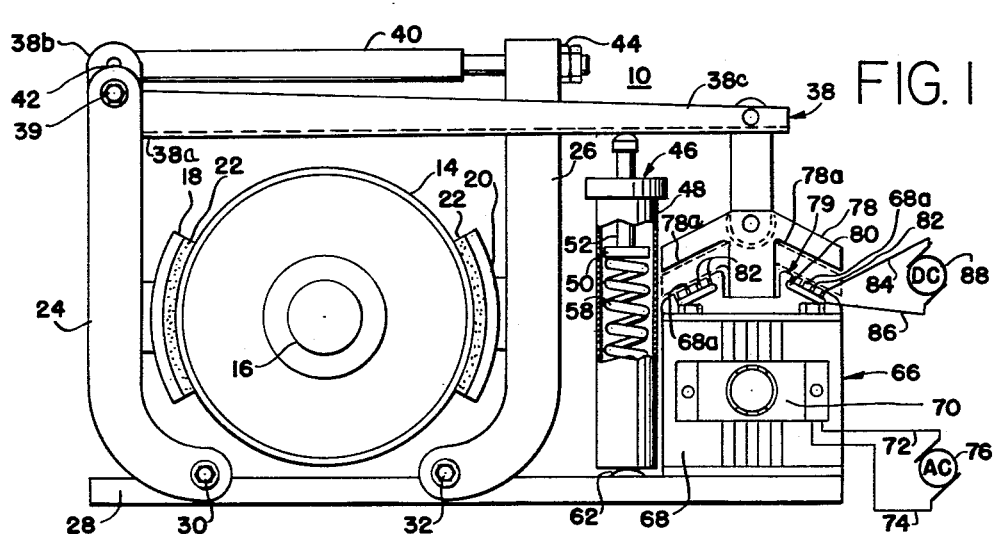
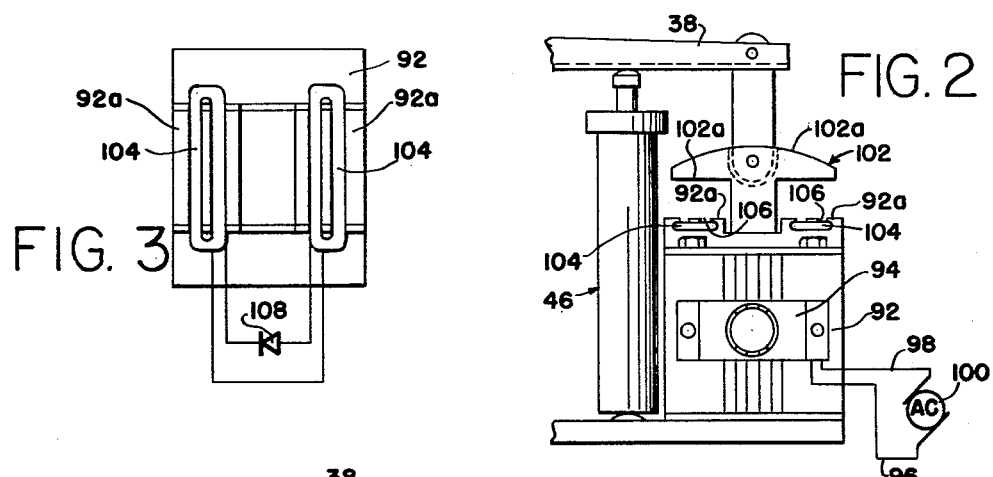
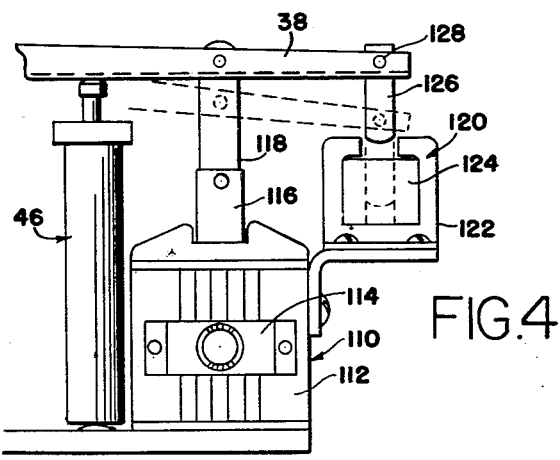
INVENTOR.
PANFILO TROMBETTA
BY Mason, Kolehmainen,
Rathburn and Wyss
ATTORNEYS

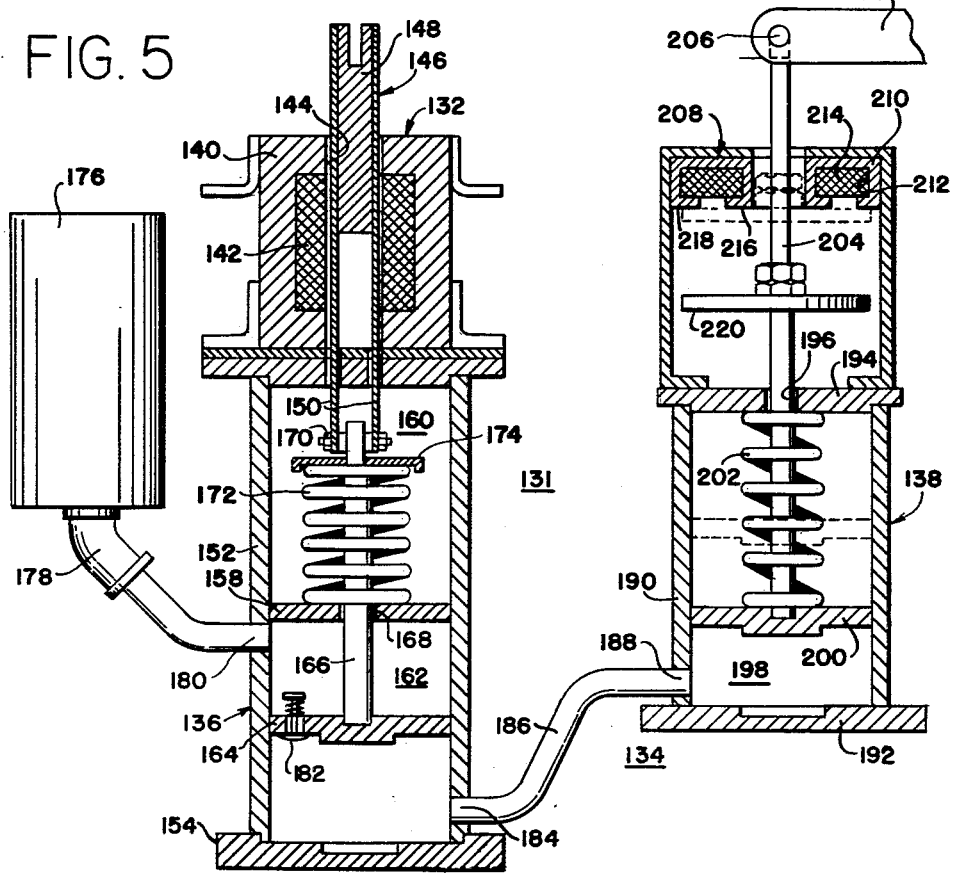
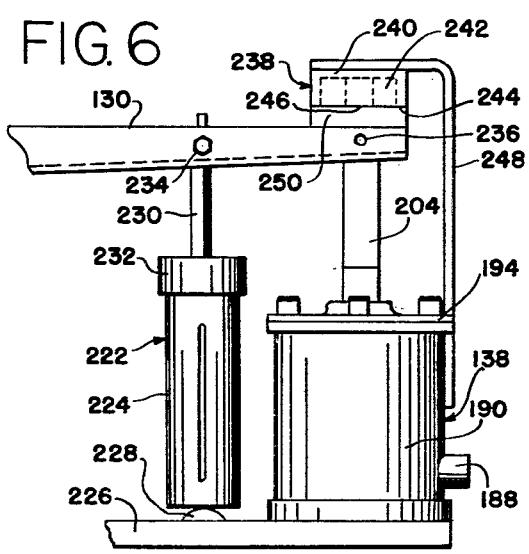

United States Patent Office 3,151,708
Patented Oct. 6, 1964

3,151,708
ELECTRICAL SYSTEM
Panfilo Trombetta, 329 N. Milwaukee St.,
Milwaukee 2, Wis.
Filed Sept. 15, 1961, Ser. No. 138,316
2 Claims. (Cl. 188—171)

This invention relates to electrical systems, and more particularly to electrical systems of applying and holding a load wherein a high power alternating current actuated motive unit capable of producing a considerable force is required to initially pick up a load and thereafter a relatively small force is sufficient to hold the load in an engaged position. One such application is in electromagnetically controlled industrial brakes, for example, in the type covered by my prior Patent No. 2,693,866, granted November 9, 1954.

Electrically controlled brakes are extensively used in industrial applications of all sorts. They are widely employed with elevators, hoists and the like. Electrical solenoids have been found to be very efficient, economical and simple means of operating industrial brakes, and have become widely used in the automatic operation of industrial brakes and similar mechanisms which require the use of large or moderate forces, acting through small and moderate strokes. The electrical solenoids employed in picking up the load of the industrial brakes are almost universally of the alternating current type. The alternating current solenoid is advantageous over the use of a direct current solenoid in that the direct current solenoid is comparatively slow in operation, especially in the larger power sizes; and further since alternating current is almost universally available in this country, the use of direct current solenoids would require large power rectifiers adding substantially to the cost of such a device. In the larger sizes the load of the industrial brake or like mechanism may be picked up by the use of an alternating current Recipromotor which would be advantageous over an alternating current solenoid in that it has a lower kva. requirement than does an alternating current solenoid of similar pulling capacity. Moreover, a Recipromotor is advantageous over an alternating current solenoid in that the Recipromotor has an unlimited length of strokes. Additionally, with the extension of the operation of the industrial brakes and similar devices to longer and larger strokes, alternating current actuated-fluid applied motive units may be provided for picking up the load. One such electrohydraulic device is described and claimed in my copending application entitled "Electrically Controlled Brake" and filed on the same date as the present application.

As exemplified by my above-mentioned prior patent, industrial brakes may be either spring-set automatically-released, or spring-released automatically-set, the setting or releasing by automatic means being electrically accomplished. Once, however, the load of the brake has been picked up by the electrical motive means, holding means must additionally be provided to hold the load against the return bias of the spring. It is generally undesirable to employ the motive means to hold the load once it has been applied. Some of the difficulties which arise in connection with electrohydraulic devices when used to hold the load after initial application thereof are brought out in my afore-mentioned copending application. Additionally, in electrical systems wherein the motive unit is an alternating current solenoid, it is undesirable to use the alternating current solenoid as the holding device after the load has been picked up, first of all, because the alternating current solenoid is very noisy when excited and it is difficult to eliminate the noise even when a shaded pole winding is used on the alternating current solenoid; and, further, the use of a continuously excited alternating current solenoid would require the solenoid to be of substantial size in order to dissipate the heat developed and the required large size would render the solenoid uneconomical and presents a space problem in suitably locating the alternating current solenoid in the industrial brake or other mechanism. Such difficulties are experienced even in those instances in which the alternating current solenoid has been made in two sections so that the two sections are used in parallel to pick up the load and then the heavy current section is cut out after the load has been picked up.

It is, therefore, an object of the present invention to provide an improved electrical system which overcomes the afore-mentioned difficulties.

A further object of the present invention is to provide an improved electrical solenoid system.

A further object of the present invention is to provide an improved means of holding a load after it has been picked up by an alternating current motive device.

A further object of the present invention is to provide an improved electrically operated industrial brake.

A further object of the present invention is to provide an industrial brake of the type actuated by alternating current with an improved means of holding the load after it has been initially picked up.

Further objects and advantages of the present invention will become apparent as the following description proceeds and the features of novelty which characterize the invention will be pointed out with particularity in the claims annexed to and forming a part of this specification.

Briefly stated, the present invention relates to an electrical system for controlling the operation of an industrial brake or other mechanism wherein a large force is required to actuate the brake and thereafter a lesser force is required to hold the load picked up by the brake. In a conventional industrial brake, the brake includes a brake drum connected to a prime mover and a pair of opposed brake shoes operatively associated with the brake drum and movable relative thereto between a set position and a released position. The brake is normally urged by a spring to one of two positions, and actuation of the brake to the other of its positions is accomplished by an electromotive unit which, according to one embodiment of the present invention, may include an alternating current electromagnetic solenoid. The alternating current solenoid may be mechanically connected to the brake or may be operatively connected through a fluid system. When applied, for example, to a spring-set electrically released industrial brake, the alternating current solenoid is effective to release the brake against the setting bias of the spring. Once the load has been picked up by the alternating current electromotive unit, the brake is held in this position by an independent direct current magnetic winding. The independent direct current winding is provided on either the same magnetic frame or an independent magnetic frame as the alternating current electromotive unit and is adapted to be separately excited from a source of direct current energy. Such an independent direct current holding magnet is not subjected to the difficulties heretofore described in connection with direct current power magnets since, for example, the speed of application is not a factor, and external rectifiers required to supply the holding current are considerably smaller than would be required for the utilization of direct current power solenoids and therefore both the cost and size of the rectifiers are minimized.

According to another embodiment of the present invention, the direct current holding winding is in the form of a shaded pole winding on an alternating current power solenoid with a direct current rectifier in the winding. Although shaded pole alternating current windings on alternating current solenoids have been known to reduce the noise of the windings, the present use of a direct current shaded pole winding is advantageous thereover since the electrical energy supplied to the alternating current solenoid may be significantly reduced during the holding period after the load has been picked up. The current used by the shaded coil winding is generated by the electromagnetism flowing through the solenoid frame and plunger.

The nature of the invention will best be understood when described in connection with the accompanying drawings, in which:

FIG. 1 is an elevational view, partly schematic, of an improved industrial brake according to the present invention;

FIG. 2 is a partial elevational view, partly schematic, of an improved industrial brake according to another embodiment of the present invention;

FIG. 3 is a schematic view of a portion of the electrical system of FIG. 2;

FIG. 4 is a partial elevational view of an industrial brake according to yet another embodiment of the present invention;

FIG. 5 is an elevational view, partly in sections, of an electrohydraulic actuating device employing the present invention; and FIG. 6 is a partial elevational view of an electrohydraulically actuated industrial brake according to yet another embodiment of the present invention.

Referring now to the drawings and specifically to the embodiment of FIG. 1, there is illustrated a spring-set electromagnetically released industrial brake unit, generally indicated by the reference number 10, and provided with an improved electrical control system according to the present invention. As illustrated, this industrial brake 10 comprises a conventional brake drum or brake wheel, generally indicated at 14, which is conventionally keyed or otherwise secured to a shaft 16 of a suitable device which may be a prime mover, such as an electric motor or the like. The prime mover which is connected to the brake drum 14, may be used to control an elevator, a hoist, or other suitable objects which it is desired further to control by the industrial brake 10 of the present invention.

For the purpose of frictionally controlling the brake drum or wheel 14, there are provided a pair of brake shoes 18 and 20 which have the conventional concave surfaces conforming to the shape of the periphery of the brake drum 14. Obviously, the brake shoes 18 and 20 could have convex surfaces for application to the interior surfaces of a suitable brake drum. In any event, each brake shoe 18 and 20 is provided with a conventional brake lining 22.

In order to support the brake shoes 18 and 20 adjacent the brake drum 14, there are provided a front or first brake shoe supporting arm 24 and a rear or second brake shoe supporting arm 26. These brake shoe supporting arms 24 and 26 may comprise castings of suitable material and the lower portions of these shoes are pivotally mounted to a base member 28 through a pair of pivot pins 30 and 32, respectively.

For the purpose of causing relative movement between the shoe supporting arms 24 and 26, there is provided a main lever or control member 38 having one end 38a pivotally mounted to the top of the front shoe supporting arm 24 through a pivot pin 39. Moreover, the pivoted end of the main lever 38 is provided with an upwardly extended elongated portion forming a short arm 38b so that there is defined an L-shaped member with the short arm 38b and with a main lever portion 38c defining the long arm of the L.

In order to interrelate the two shoe supporting arms 24 and 26, there is provided a tie bar 40 which has one end thereof pivotally connected to the short arm 38b of the main lever 38 by a pivot pin 42. The end of the tie bar 40 remote from the pivot pin 42 is threaded so as to accommodate suitable nut means 44 and slidably extends through an aperture in the rear brake supporting arm 26, thereby to adjust the maximum separation between the ends of the shoe supporting arms 24 and 26. It will be apparent that pivotal movement of the main lever 38 in a counterclockwise direction, as viewed in FIG. 1 of the drawings, will by virtue of the tie bar 40 apply the brake by causing the brake shoes 18 and 20 to move towards each other and toward the brake drum 14.

In order to provide the setting force for setting the spring-set industrial brake illustrated in FIG. 1, there is provided a self-contained compression spring unit generally designated by the reference numeral 46 comprising a spring cylinder 48 closed at the bottom and open at the top. A piston 50 is reciprocable therein along the longitudinal axis of the cylinder 48 and a piston rod 52 is secured to the piston 50 and extends through the open upper end of the cylinder 48. The end of the piston rod 52 which extends outside of the cylinder 48 pivotally bears against the main lever 38 at a distance remote from the pivot pin 39. A suitable compression spring 58 is disposed within the cylinder 48 with one end thereof bearing against the piston 50 and the other end thereof against the closed bottom of the cylinder 48, thereby continuously biasing the piston rod 52 upwardly. The spring unit 46 bears against the base 28 through a hinge pin 62. When the spring unit 46 is in the position illustrated in FIG. 1, and no other force is applied to the main lever 38, it will bias this lever 38 in a counterclockwise position about the pivot pin 39 with the result that the brake is applied to the brake drum 14.

To automatically release the brake 10, the brake is provided with an alternating current actuating or motive device, here shown as an alternating current solenoid 66 mounted on the base 28 and mechanically connected to the lever 38 so that when energized it will pull the lever clockwise about the pivot pin 39, as viewed in FIG. 1 of the drawings, against the force of the spring unit 46. As is conventional practice with alternating current solenoids, the solenoid 66 is provided with a frame or jacket 68 formed of a stack of laminations of mechanically attractive material and carrying an electromagnetic winding 70. The winding 70 is connected by a pair of leads 72, 74 to a source of alternating current, here illustrated schematically as an alternating current generator 76. The frame 68 and winding 70 are provided with aligned openings forming a core movably receiving a plunger assembly 78. As is conventional practice in alternating current solenoids, the plunger assembly 78 is formed of a stack of laminations of magnetically attractive material. The frame 68 forms a pair of pole members 68a and the plunger assembly forms a pair of confronting pole members 78a, so that the plunger assembly 78 is positioned for movement in the frame 68 between a first or deenergized position, as illustrated in solid in FIG. 1, to a second or energized position, illustrated in phantom in FIG. 1, in response to the energization of the winding 70, the poles 68a and 78a being mutually attractive when the winding 70 is energized.

Energization of the winding 70 is effective to move the plunger assembly 78 downwardly, as viewed in FIG. 1, to pivot the main lever 38 clockwise about the pivot pin 39 and to thereby release the brake 10. Once the solenoid 66, however, has picked up the load, the large force necessary to release the brake 10 is no longer required. According to the present invention, after actuation of the brake by the alternating current actuating device 54, the brake is held in a released position by a direct current solenoid indicated generally at 79, here formed integral with the alternating current solenoid and having a common magnetic frame with the alternating current solenoid 66, and consisting of a direct current holding winding 80 positioned in slots 82 in the frame 68. In this manner, the same frame 68 and plunger assembly 78 is effective to form the magnetic circuit of the alternating current solenoid 66 as well as of the direct current holding solenoid 79. The holding solenoid 79 is connected through a pair of leads 84 and 86 to a source of direct current here illustrated for purposes of clarity as a direct current generator 88; however, in a commercial installation the source of direct current may be furnished by a rectifier from the alternating current generator 76 as is well known in the art.

It will be seen that, according to the present invention, as illustrated in the embodiment of FIG. 1, there is provided an electrical system for applying and holding a load to an industrial brake wherein a high power alternating current electromotive unit or solenoid 66 is provided which is capable of producing a considerable force required to initially pick up the load, and thereafter a relatively small force provided by the direct current holding solenoid 79 is sufficient to hold the load in an engaged position. This arrangement has all the advantages of an alternating current solenoid for picking up the load, including rapid operation and a large force over a relatively short stroke; and additionally the advantages of a direct current holding solenoid are realized.

FIGS. 2 and 3 illustrate an industrial brake according to the present invention wherein an alternating current solenoid is employed as the alternating current electromotive device and the alternating current solenoid is provided with a direct current shaded pole winding to form a direct current holding solenoid. Similar parts of FIG. 1 and FIGS. 2 and 3 are identified by the same numerals. Referring now specifically to FIGS. 2 and 3, there is illustrated a main lever 38 of an industrial brake, which may be similar to the brake of FIG. 1 and which includes a compression spring assembly 46 biasing the main lever 38 counterclockwise. An alternating current electromotive device here illustrated as an actuating current solenoid 90, is connected to move the lever 38 downwardly. The solenoid 90 includes a frame or jacket 92 formed of laminations of magnetic materials as is conventional practice in alternating current solenoids, and provided with a winding 94 connected through a pair of leads 96 and 98 to a source of alternating current, here shown as an alternating current generator 100. The frame 92 and windings 94 are provided with central aligned apertures which form a core movably receiving a plunger assembly 102. The frame 92 is provided with a pair of pole faces 92a and the plunger assembly 102 includes a pair of confronting pole faces 102a so that, when energized, the pole faces 92a and 102a are mutually attracted and the plunger assembly 102 is pulled downwardly into the frame 92 of the solenoid 90. As is conventional practice in alternating current solenoids, the plunger assembly 102 is formed of laminations of magnetically attractive material.

According to the present invention, the brake illustrated in FIGS. 2 and 3 is provided with a direct current holding magnet having a common magnetic frame with the alternating current magnet 90 and including a pair of shaded pole windings 104 positioned in slots 106 in the frame 92. The frame 92 and the plunger assembly 102 which form the magnetic circuit for the alternating current solenoid also serve as the magnetic circuit for the direct current solenoid 104. The pair of windings 104 are serially connected together through a recifier 108 so that current can flow through the windings 104 only in one direction. In this manner, the windings 104 produce the direct current holding solenoid which is activated by the alternating current in the winding 94. When the brake has been released and only the force required to hold the brake in the released position is needed, the direct current solenoid 104 acting through the magnetic path formed by the frame 92 and plunger 102 is effective to hold the brake in this position. The current in the direct current solenoid is induced by the electromagneticism flowing through the solenoid frame 92 and plunger assembly 102; to this end, the alternating current winding 94 is provided with alternating current at a reduced power.

FIG. 4 illustrates yet another embodiment of an industrial brake employing the present invention. Similar parts of FIG. 4 and the embodiments of FIG. 1 and of FIGS. 2 and 3 are identified by the same numerals. The industrial brake of FIG. 4 includes a main lever 38 operable to actuate an industrial brake, which may be similar to the brake of FIG. 1, and which is biased to a brake-set position by a compression spring unit 46. In order to move a main lever 38 to a released position against the return bias of the compression spring unit 46, the brake is provided with an alternating current solenoid generally indicated at 110 and including a frame 112 carrying an alternate current winding 114. The frame 112 and winding 114 are provided with aligned central apertures which movably receive a plunger assembly 116. As is conventional with alternating current solenoids, the frame and plunger are each formed of laminations of magnetically attractive material. The plunger 116 is pivotally connected to the main lever 38 through a tie rod 118 and is effective, upon energization of the winding 114, to be mutually attractive with the frame 112 so that the plunger assembly 116 is then moved downwardly, moving the main lever 38 downwardly. Once the load of the brake has been picked up by the alternating current solenoid 110, the brake is held in the released position by a direct current solenoid generally indicated at 120 and including a frame 122 of magnetizable material and a winding 124 for connection to a source of direct current, and additionally including a direct current plunger 126 pivotally connected to the main lever 38 through a pivot pin 128. As is well known in the construction of direct current solenoids, the frame 122 and plunger 126 are preferably formed of solid metal rather than laminations as are used in alternating current solenoids.

It is seen that in an electrical system according to the embodiment of FIG. 4, the electromotive unit is provided by an alternating current solenoid 110 capable of producing a relatively large force and once the load has been picked up by the alternating current solenoid 110, the load is held through the direct current solenoid 120. Since the plunger 126 of the direct current solenoid 120 is positioned within the core of the frame 122 and winding 124 when the load has been picked up by the alternating current solenoid 110, as illustrated in phantom in FIG. 4, the direct current solenoid 120 need be capable of providing but a small force, such small force being sufficient to maintain the load once it has been picked up by the alternating current solenoid 110. In a commercial development, the direct current winding 124 can be supplied by direct current rectifiers connected to the alternating current source provided to operate the relatively high power alternating current solenoid 110. Since the direct current solenoid 120 draws a comparatively smaller power than does the alternating current solenoid 110, the rectifiers required to supply the direct current solenoid 120 may be comparatively small since they do not need to carry the full power load supplied to the alternating current solenoid 110.

There is illustrated in the embodiment of FIG. 5 an electro-fluid motive device and a direct current holding solenoid for use with an industrial brake or similar device. Referring now specifically to FIG. 5, there is illustrated an operaing member 130 which may correspond to the main lever 38 of an industrial brake similar to the industrial brake illustrated in FIG. 1 and connected to be positioned by an electrohydraulic motive system 131. The electromotive system of FIG. 5 is more fully described in my afore-mentioned copending application, filed on even date herewith, and need not be fully described herein. However, briefly, the lever 130 is connected to be moved in one direction to an alternating current solenoid 132 acting through a fluid or hydraulic system 134, and including a primary hydraulic cylinder or pump 136 and a secondary hydraulic cylinder 138. The motive unit of the alternating current actuating device 131 comprises the alternating current solenoid 132 and includes a frame or jacket 140 housing an alternating current winding 142 adapted to be connected to a source of alternating current. The frame 140 and winding 142 are provided with aligned apertures forming a central core 144, receiving a plunger assembly 146. The plunger assembly 146 may include a plunger portion 148 and a pair of pusher bars 150 which are of nonmagnetic material and which extend to the core 144 for the purpose of applying a push load on the primary hydraulic cylinder 136. As is conventional practice in the construction of alternating current solenoids, the frame 140 and the plunger portion 148 of the plunger assembly 146 are each formed of laminations of magnetically attractive material such as iron.

In order to provide a source of hydraulic fluid under pressure, the solenoid 146 is connected to actuate the pump 136. The pump 136 is formed of a cylindrical side wall 152 closed at the bottom by a bottom wall 154 and having an intermediate partition 158 with the solenoid 146 mounted on the upper open end of the side wall 152. The partition 158 divides the cylinder 136 into a spring chamber 160 and a hydraulic chamber 162. A piston 164 is slidably received in the hydraulic chamber 162 and is connected to a piston rod 166 which extends upwardly through an aperture 168 in the partition 158 and which is connected to the plunger assembly 148 of the solenoid 146 through the pin or bolt 170. A compression spring 172 is positioned in the spring chamber 160 and is compressed between the partition 158 and a washer 174 secured to the upper end of the piston rod 166 so that the compression spring 172 continuously biases the piston rod 166 and, therefore, the piston 164 upwardly. A hydraulic reservoir 176 communicates with the hydraulic chamber 162 through a supply pipe 178 which discharges into the hydraulic chamber 162 through a port 180 positioned near the upper end of the hydraulic chamber 162 in the side wall 152 thereof. Moreover, the piston 164 is provided with a check valve 182 which provides for the passage of hydraulic fluid downwardly only with reference to the piston 164. The hydraulic reservoir 176 and the check valve 182 cooperate to keep the hydraulic chamber 162 continuously full of hydraulic fluid; any leakage of hydraulic fluid out of the system during the down or power stroke of the piston 164 is replaced through the check valve 182 during the next upstroke of the piston 164. A discharge port 184 is provided near the lower closed wall 154. The solenoid 146 and the pump 136 together function as a fluid pump which, when actuated by an alternating current, are effective to provide a hydraulic fluid under pressure at the discharge port 184. This fluid is then transferred to the secondary or brake actuating cylinder 138 through a supply conduit 186.

For the purpose of moving the main lever or control member 130 of an industrial brake or like device to one of its positions, there is provided the secondary or brake actuating cylinder 138. Hydraulic fluid from the pump 136 is supplied to the secondary cylinder 138 through an inlet port 188 located near the bottom in a cylindrical side wall 190 of the secondary cylinder 138. The cylinder 138 is closed at the bottom by a bottom wall 192 and may be covered at the top by an upper cover portion 194 which is provided with a central aperture 196 thereby forming a working chamber 198 within the cylinder 138. Positioned within the chamber 198 is a piston 200 slidably received within the cylinder 138 and biased downwardly by a compression spring 202, which acts between the lower surface of the cover 194 and the upper surface of the piston 200 to continuously bias the piston 200 downwardly. The piston 200 is connected to a piston rod 204 which extends vertically upwardly through the aperture 196 of the cover 194 and is connected to the control member 130 by a pivot pin 206.

In the operation of the electrohydraulic motive unit heretofore described, actuation of the control lever 130 is accomplished by the connection of the alternating current solenoid 132 to a source of alternating current so that the plunger assembly 146 of the solenoid 132 is mutually attracted with the frame 140 thereof and is moved downwardly as viewed in FIG. 5. The downward movement of the plunger assembly 146 moves the piston 164 downwardly pumping hydraulic fluid out of the hydraulic chamber 162 through the port 184 and conduit 186 and into the working chamber 198 of the secondary cylinder 138. The force of the plunger assembly 146 is sufficient to overcome the return bias of the compression spring 172 to actuate the piston 164. The pressurized fluid then acts against the piston 200 to move the piston 200 and piston rod 204 upwardly against the return bias of the compression spring 202 to move the control lever 130 to its desired position. Once the lever 130 has been moved to its desired position, a considerably small force can be used to hold the lever in this position.

According to the present invention, there is provided a direct current magnet, generally illustrated at 208, to hold the piston rod 204 in its actuated position. The direct current magnet 208 includes an annular frame member 210 having a central opening 212 containing a direct current winding 214 of annular shape and terminating at its lower end with an inner and outer pole member 216 and 218, respectively. The direct current solenoid 208 is additionally provided with a disk-shaped stator or plunger 220 secured to the piston rod 204 at a longitudinal position to engage against the pole faces 216 and 218 when the piston 204 is in its uppermost position, as illustrated in phantom in FIG. 5. As is conventional in the design of direct current solenoids, the frame 210 and the plunger 220 are of solid, magnetically attractive material such as iron.

It will be appreciated that in the embodiment of FIG. 5, there is provided the alternating current actuating device including the hydraulic pump consisting of the solenoid 132 and the cylinder 136 and the hydraulic actuating cylinder 138 which is effective to move the control member 130 into one of its positions, and the direct current solenoid is thereafter effective to hold the control member 130 in that position.

A modified form of an electropneumatic actuating system with a direct current holding magnet is illustrated in partial view in FIG. 6. As therein illustrated, a control member 130, which may correspond to the control member 130 of FIG. 5 and which may be connected to actuate a spring-released electrically set industrial brake of the type described in my above-mentioned patent, is spring biased downwardly, as viewed in FIG. 6, by a tension spring assembly 222, which may be similar to the spring assembly more fully illustrated and described in my prior Patent 3,115,956, granted December 31, 1963, and which briefly includes an outer cylindrical housing 224 closed at the bottom end and secured to a base plate 226 of an industrial brake by a pin 228. The spring assembly 222 includes a piston rod 230 extending through an opening in an upper cover 232 of the housing 224 and which is continuously biased downwardly by spring means within the housing 224. The piston rod 230 is pivotally connected to the control member 130 by a pin connection, here illustrated as a bolt 234. In this manner, the control member 130 is continuously biased downwardly by the spring assembly 222.

In order to move the control member 130 to its upper position, illustrated in FIG. 6, against the downward bias exerted by the spring assembly 222, there is provided a fluid operated electromotive actuating device which may be similar to the electrohydraulic motive device 131 more fully illustrated in FIG. 5, and wherein only the secondary or brake actuating cylinder 138 thereof is illustrated in FIG. 6 for purposes of clarity. Corresponding parts of FIGS. 5 and 6 are therefore identified by the same numerals. The brake actuating cylinder 138 is provided with inlet port 188 adapted to be connected to a source of hydraulic fluid under pressure, and containing a piston rod 204 extending through an aperture in the upper cover 194 enclosing the cylindrical housing 190 of the cylinder 138. The upper end of the piston rod 204, which is external of the cylinder 138, is pivotally connected to the control member 130 by a pin or bolt 236.

According to the present invention, the electrohydraulically actuated industrial brake of FIG. 6 is held in its actuated position by a direct current solenoid generally indicated at 238 and having a frame or field member 240 carrying a direct coil winding 242 of annular shape and terminating in a pair of pole portions 244 and 246. The frame portion 240 is mounted on a stationary portion of the industrial brake, for example, by a bracket 248. The direct current solenoid 238 additionally includes a stator or plunger 250 secured to the control member 130 in spaced relation to the frame 240 and adapted to engage the pole portions 244 and 246 when the control member 130 is in its uppermost position, as illustrated in FIG. 6. As is conventional practice in direct current solenoids, the frame 240 and plunger 250 are preferably of solid magnetically attractive material.

In the operation of the electrohydraulically actuated industrial brake of FIG. 6, the load of the industrial brake or other device picked up by tthe control member 130 is picked up by an alternating current actuating device, of which only the hydraulic cylinder 138 is illustrated in FIG. 6 for purposes of clarity, and the control member is thereafter held in position by the direct current solenoid 238. It will be appreciated that since the stator 250 of the direct current solenoid 238 engages the pole members 244 and 246 as a result of the upward movement of the control member 130 by the secondary cylinder 138, the direct current solenoid 238 may be much smaller than would be required to raise the control member 130 to the illustrated position. Moreover, once the load in the control lever 130 has been picked up by the direct current solenoid 238, the power may be removed from the secondary cylinder 138 so that the system is preset for quick actuation by the spring assembly 222 when the direct current power is removed from the direct current solenoid 238.

While various embodiments of the invention have been described by way of illustration, it is to be understood that many modifications will occur to those skilled in the art. It is, therefore, to be understood that it is intended in the appended claims to cover all such modifications that fall within the true spirit and scope of this invention.

What is desired to be secured by Letters Patent is:

1. An industrial brake comprising a brake drum, brake means for frictionally engaging said drum, lever means for actuating said brake means and movable between a brake-set position and a brake-released position, spring means biasing said lever means toward one of said positions, an alternating current solenoid connected to move said lever means to the other one of said positions, said alternating current solenoid being mechanically connected to said lever means, and a direct current solenoid means connected to hold said lever means in the other one of said positions after movement thereto by said alternating current solenoid, said alternating current solenoid including an alternating current winding and a magnetic circuit including a stationary frame portion and a plunger portion mutually magnetically attractive, said plunger portion being mechanically coupled to said member, said direct current solenoid comprising a shaded pole winding and a magnetic circuit at least a part of which is common with at least a part of at least one of said portions of said alternating current magnetic circuit, and rectifying means connected across said direct current winding, the current used by said direct current winding being generated by the induced field in the portion of said alternating current solenoid magnetic circuit which is common to said direct current solenoid magnetic circuit.

2. An industrial brake comprising a brake drum, brake means for frictionally engaging said drum, lever means for actuating said brake means and movable between a brake-set position and a brake-released position, spring means biasing said lever means toward a brake-setting position, an alternating current solenoid connected to move said lever means to a brake-released position, and a direct current solenoid means connected to hold said lever means in said brake-released position after movement thereto by said alternating current solenoid, said alternating current solenoid including a frame formed of a stack of laminations and providing a pair of spaced pole members; an electromagnetic winding carried by said frame adapted for connection to a source of alternating current, a plunger assembly formed of a stack of laminations and including a pair of pole members fronting the first-mentioned pole members, one end of said plunger assembly being operatively connected to said lever means wherein the surfaces of the first-mentioned pole members confronting the second-mentioned pole members being provided with winding slots, and a direct current holding winding wound in said slots on the first-mentioned pole members and adapted for connection to a source of direct current.

References Cited in the file of this patent

UNITED STATES PATENTS

| | | |
|---|---|---|
| 1,991,903 | Logan | Feb. 19, 1935 |
| 2,410,183 | Ray | Oct. 29, 1946 |